United States Patent
An et al.

(10) Patent No.: US 8,547,060 B2
(45) Date of Patent: Oct. 1, 2013

(54) HIGH OUTPUT BATTERY PACK AND METHOD OF CONTROLLING THE HIGH OUTPUT BATTERY PACK

(75) Inventors: Jin-Hong An, Yongin-si (KR); Kyung-Won Seo, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 341 days.

(21) Appl. No.: 12/977,469

(22) Filed: Dec. 23, 2010

(65) Prior Publication Data

US 2011/0234171 A1 Sep. 29, 2011

(30) Foreign Application Priority Data

Mar. 29, 2010 (KR) .................. 10-2010-0028078

(51) Int. Cl.
*H01M 10/44* (2006.01)
*H01M 10/46* (2006.01)

(52) U.S. Cl.
USPC ........................................ 320/112

(58) Field of Classification Search
USPC .................. 320/104, 112, 114, 134, 135, 136
See application file for complete search history.

(56) References Cited

U.S. PATENT DOCUMENTS

| | | | |
|---|---|---|---|
| 3,648,145 A * | 3/1972 | Meyer et al. | 320/136 |
| 2008/0048608 A1 | 2/2008 | Lim et al. | |
| 2009/0322215 A1 | 12/2009 | Sung et al. | |
| 2010/0127658 A1 | 5/2010 | Fazakas | |

FOREIGN PATENT DOCUMENTS

| | | |
|---|---|---|
| JP | 3-55762 A | 3/1991 |
| JP | 8-278837 A | 10/1996 |
| JP | 9-63597 A | 3/1997 |
| JP | 3803412 B2 | 8/2006 |
| KR | 1020010040533 A | 5/2001 |
| KR | 1020040073944 A | 8/2004 |
| KR | 1020050107460 A | 11/2005 |
| KR | 10-0818519 B1 | 11/2007 |
| KR | 10-2008-0017824 A | 2/2008 |
| KR | 1020090022293 A | 3/2009 |
| KR | 1020090027808 A | 3/2009 |

OTHER PUBLICATIONS

Registration Determination Certificate issued by Korean Intellectual Property Office on Aug. 19, 2011, corresponding to KR 10-2010-0028078 and Request for Entry attached herewith.

* cited by examiner

*Primary Examiner* — Edward Tso
(74) *Attorney, Agent, or Firm* — Robert E. Bushnell, Esq.

(57) ABSTRACT

A battery pack and a method of controlling the battery pack. The battery pack includes a battery cell and a capacitor connected in parallel to the battery pack. Accordingly, the battery power and the distance travelled by an electric transport device that requires an instantaneous high power output, such as an E-bike, may be increased.

15 Claims, 5 Drawing Sheets

HIGH OUTPUT BATTERY PACK AND METHOD OF CONTROLLING THE HIGH OUTPUT BATTERY PACK

CLAIM OF PRIORITY

This application makes reference to, incorporates into this specification the entire contents of, and claims all benefits accruing under 35 U.S.C. §119 from an application earlier filed in the Korean Intellectual Property Office on Mar. 29, 2010, and there duly assigned Serial No. 10-2010-0028078.

BACKGROUND OF THE INVENTION

1. Field of the Invention

One or more embodiments of the present invention relate to a battery pack, and more particularly, to a high output battery pack and a method of controlling the battery pack.

2. Description of the Related Art

In general, rechargeable batteries are actively researched due to the development of mobile electronic appliances such as cellular phones, laptop computers, camcorders, personal digital assistants (PDA), and the like. In particular, examples of rechargeable batteries are nickel-cadmium batteries, lead storage batteries, nickel metal hydride batteries, lithium ion batteries, lithium polymer batteries, metal lithium batteries, and air zinc storage batteries. A rechargeable battery is combined with a circuit to form a battery pack, and is charged or recharged via an external terminal of the battery pack.

SUMMARY OF THE INVENTION

It is therefore an aspect of the present invention to provide an improved battery pack and an improved method for controlling the battery pack.

It is another aspect of the present invention to provide a battery pack capable of supplying a high amount of current to an electric transport that requires an instantaneous high power output.

Additional aspects will be set forth in part in the description which follows and, in part, will be apparent from the description, or may be learned by practice of the presented embodiments.

According to one or more embodiments of the present invention, a battery pack may be constructed with a battery cell, a first discharging device connected between the battery cell and a first node, a capacitor connected to the first node in parallel with the battery cell, a second discharging device connected between the first node and a load, and a microcomputer controlling the first discharging device and the second discharging device.

The capacitor may be a motor-driving capacitor of an electric transport device.

The load may be a motor of an electric transport device.

When initially driving the motor, an electric energy charged in the capacitor may be discharged to the load according to the controlling of the microcomputer.

The electric transport device may be an E-bike.

The battery pack may further include a capacitor charging and discharging control unit connected between the first node and the capacitor. The microcomputer may control the capacitor charging and discharging control unit.

The capacitor charging and discharging control unit may include a current restricting unit connected to the capacitor and restricting an electric current flowing to the capacitor, a capacitor charging device connected between the first node and the current restricting unit, and a capacitor discharging device connected between the capacitor and the first node.

The microcomputer may control the capacitor charging device and the capacitor discharging device.

At least one of the first discharging device, the second discharging device, the capacitor charging device, and the capacitor discharging device may include a field effect transistor (FET).

According to one or more embodiments of the present invention, a method of controlling a battery pack is provided. The battery pack includes a battery cell, a capacitor connected in parallel with the battery cell, a first discharging device, a second discharging device, and a microcomputer. The method includes charging the capacitor according to a voltage across the battery cell by turning on the first discharging device, and discharging an electric energy charged in the capacitor to a load by turning on the second discharging device.

The discharging may be performed when the load is a motor of an electric transport device.

The load may be a motor of an electric transport device.

In the discharging, the electric energy charged in the capacitor may be discharged to the load according to the controlling of the microcomputer.

According to one or more embodiments of the present invention, a method of controlling a battery pack is provided. The battery pack includes a battery cell, a capacitor connected in parallel with the battery cell, a capacitor charging device, a current restricting unit, and a capacitor discharging device connected between the battery cell and the capacitor, a first discharging device, a second discharging device, and a microcomputer. The method includes turning on the first discharging device and the capacitor charging device, restrictively charging the capacitor according to a voltage across the battery cell by using the current restricting unit, and discharging an electric energy charged in the capacitor by turning on the capacitor discharging device and the second discharging device.

The load may be a motor of an electric transport device.

In the discharging, when initially driving the motor, the electric energy charged in the capacitor may be discharged to the load by turning on the capacitor discharging device and the second discharging device according to the controlling of the microcomputer.

At least one of the first discharging device, the second discharging device, the capacitor charging device, and the capacitor discharging device may be a field effect transistor (FET).

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION

A contemporary battery pack includes a battery cell and a peripheral circuit including a charge and discharge circuit. The peripheral circuit is formed of a printed circuit board and is combined with the battery cell. When an external power source is connected to the battery pack via an external terminal, the battery cell is charged by the external power source via the external terminal and the charge and discharge circuit. When a load is connected to the external terminal, the battery cell supplies power to the load via the charge and discharge circuit and the external terminal. The charge and discharge circuit is arranged between the external terminal and the battery cell and controls charging and discharging of the battery cell.

Embodiments of the present invention will now be described more fully with reference to the accompanying drawings, in which exemplary embodiments of the invention are shown. In the description of the present invention, certain detailed explanations of related art are omitted when it is deemed that they may unnecessarily obscure the essence of the invention. Also, the meaning of the terms used in the present specification and claims of the present invention should not be limited to be of ordinary or literary meaning but construed as meanings and concepts not departing from the spirit and scope of the invention based on the principle that the inventor is capable of defining concepts of terms in order to describe his or her invention in the most appropriate way.

Figure 1:
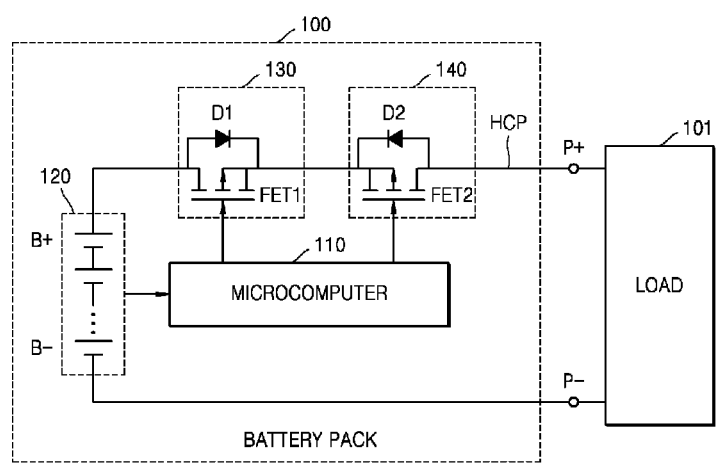
FIG. 1 is a circuit diagram of a contemporary battery pack.

FIG. 1 is a circuit diagram illustrating a battery pack 100 according to the related art.

Referring to FIG. 1, battery pack 100 includes a rechargeable battery cell 120 and a protection circuit, and is installed in an external system such as a portable laptop computer and charges or discharges battery cell 120.

In detail, battery pack 100 includes battery cell 120, an external terminal (not shown) that is connected in parallel to battery cell 120, and a charging device 130 and a discharging device 140 that are serially connected to a high current path (HCP) between battery cell 120 and the external terminal, and the protection circuit, which includes a microcomputer 110 that is connected in parallel to battery cell 120, charging device 130, and discharging device 140.

Although not shown in FIG. 1, the protection circuit of battery pack 100 may further include a current sensing unit that is serially connected to the HCP between battery cell 120 and the external terminal and that is also connected to microcomputer 110, and a self-protecting control unit that is used to break a fuse positioned on the HCP according to the controlling of microcomputer 110 or the external system. If battery cell 120 is determined to be over-charged or over-discharged, microcomputer 110 turns off charging device 130 and discharging device 120 or breaks the fuse to block overcharging or over-discharging of battery cell 120. That is, when battery cell 120 is determined to be over-charged or over-discharged, microcomputer 110 outputs a corresponding control signal to turn off charging device 130 and discharging device 140, or to blow the fuse using the self-protecting control unit.

Battery pack 100 is connected to the external system via the external terminal to be charged or discharged. The HCP between the external terminal and battery cell 120 is used as a charge and discharge path, and a relatively large electric current flows through the HCP. Battery pack 100 may further include a system management BUS (SMBUS) between microcomputer 110 of the protection circuit and the external terminal for the purpose of communicating with the external system.

When driving an electrically driven transport device such as an E-bike, an E-scooter, etc., by using battery pack 100 according to the related art, a large number of battery cells needs to be connected in parallel in order to supply a current that is needed when starting the transport device or driving the transport device uphill, due to the characteristics of the transport device. When a lot of battery cells are connected in parallel, however, the volume of battery pack 100 increases, and the lifespan of and the distance traveled by the transport device that may be covered by battery pack 100 are reduced due to a high current flowing in battery pack 100.

Figure 2:
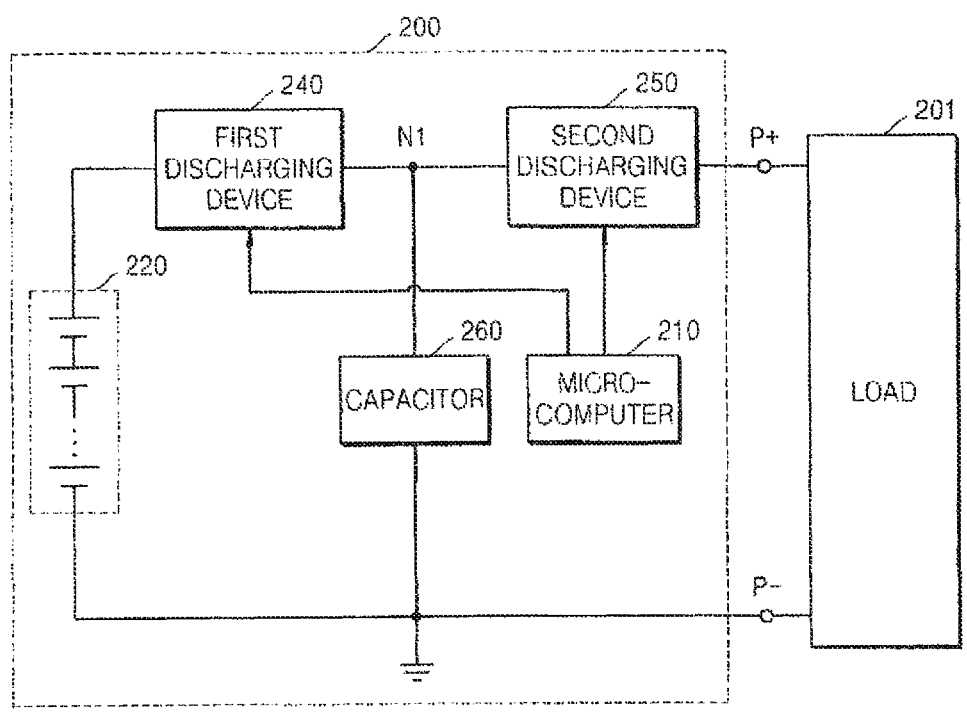
FIG. 2 is a circuit diagram illustrating a battery pack constructed as an embodiment according to the principles of the present invention.

FIG. 2 is a circuit diagram illustrating a battery pack 200 constructed as an embodiment according to the principles of the present invention.

Referring to FIG. 2, battery pack 200 includes a microcomputer 210, a battery cell 220, a first discharging device 240, a second discharging device 250, and a capacitor 260. Although not shown in FIG. 2, battery pack 200 may further include a charging device to prevent overcharging of battery cell 220. When an external power source is connected to charging and discharging terminals P+ and P− to charge battery cell 220, microcomputer 210 checks a voltage across battery cell 220, and if microcomputer 210 determines that the voltage across battery cell 220 is over a predetermined voltage, the charging device is turned off to prevent charging.

First discharging device 240 is connected between battery cell 220 and a first node N1. First discharging device 240 functions as a switch for discharging battery cell 220 and prevents over-discharging of battery cell 220 by being turned according to the controlling of microcomputer 210. First discharging device 240 may be formed of a field electric transistor and a parasitic diode, or may be an electric device that performs the function described above as well as other types of switching functions.

A capacitor 260 is connected to first node N1 in parallel to battery cell 220. When first discharging device 240 is turned on, an electric current flows from battery cell 220 to capacitor 260, and electric energy is stored in capacitor 260 while first discharging device 240 is turned on. The electric energy stored in capacitor 260 is proportional to a capacity of capacitor 260, that is, a capacitance C, and thus capacitor 260 may be used as a capacitor for driving a motor of an electric transport device. For example, capacitor 260 may be a super-capacitor of several farads or greater.

Second discharging device 250 is connected between first node N1 and a load 201. When second discharging device 250 is turned on, an electric current flows from battery cell 220 to load 201. Also, an electric current corresponding to the electric energy stored in capacitor 260 is also transmitted to load 201. Accordingly, the current from battery cell 220 and the current from capacitor 260 are supplied together to load 201. Here, the load requires a sudden high power output. For example, load 201 may be a motor that is used in electric transport devices such as E-bikes, E-scooters, electric wheel chairs, and electromotive carts, and the motor may be used when a high current is required as the motor is initially driven or when climbing an uphill road. Second discharging device 250 is a switch for driving a load connected to discharging terminal (P−), and may include a field effect transistor and a parasitic diode, but is not limited thereto, and instead may be an electric device that performs the function described above as well as other types of switching functions.

Microcomputer 210 controls switching operations of first discharging device 240 and second discharging device 250.

When capacitor 260 needs to be charged, first discharging device 240 and second discharging device 250 are turned on to charge capacitor 260. When there is no need to supply a current to load 201, for example, when an E-bike is stopped, first discharging device 240 is turned on and second discharging device 250 is turned off, so that a current is supplied only to capacitor 260.

Figure 4:
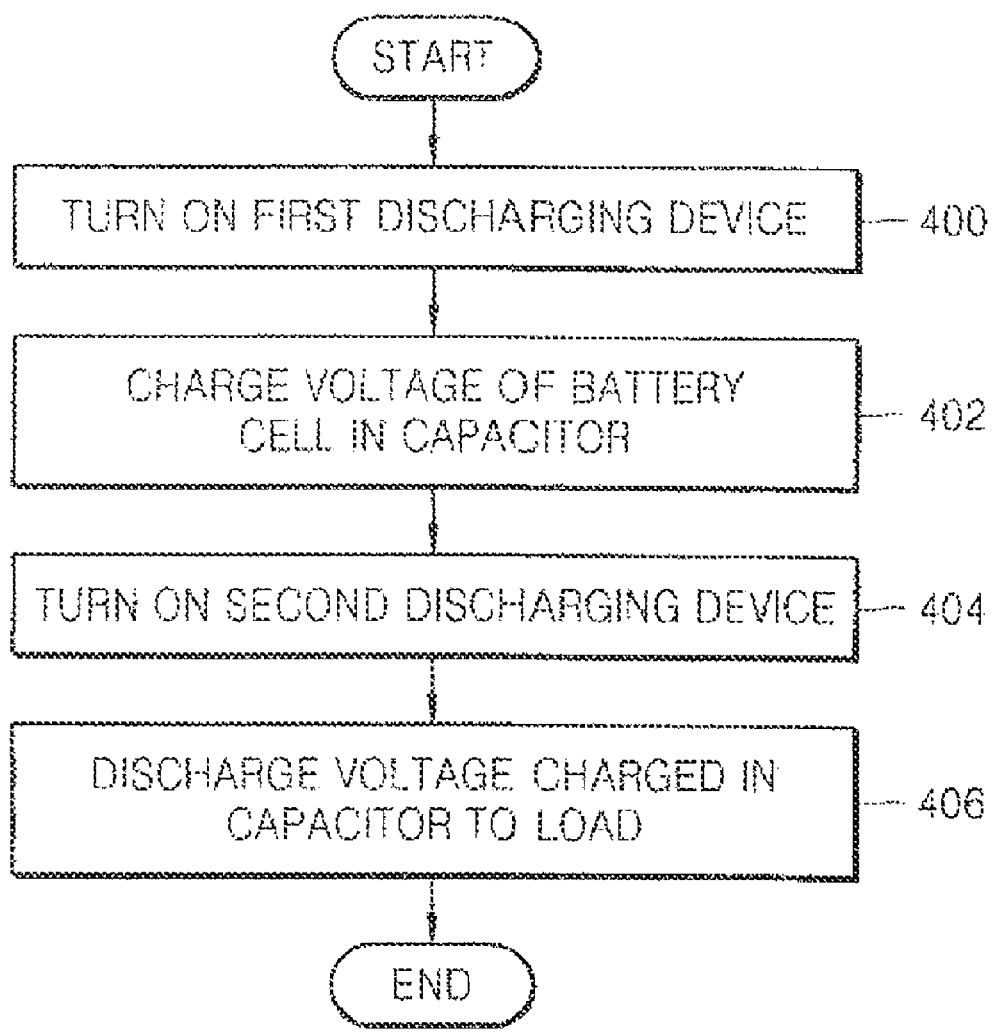
FIG. 4 is a flowchart illustrating a method of controlling the battery pack of FIG. 2, as an embodiment according to the principles of the present invention.

FIG. 4 is a flowchart illustrating a method of controlling battery pack 200 of FIG. 2, as an embodiment according to the principles of the present invention.

Referring to FIG. 4, in operation 400, first discharging device 240 is turned on. When both first and second discharging devices 240 and 250 are turned on, part of an electrical current from battery cell 220 flows to capacitor 260 and electrically energy is stored in the capacitor 260, and the remaining-part of the current from battery cell 220 flows through load 201 at the same time. When first discharging device 240 is turned on and second discharging device 250 is turned off, electric energy is only stored in capacitor 260, and no electrically current flows through load 201. In operation 402, battery cell 220 charges capacitor 260 to the voltage of battery cell 220. Capacitor 260 is a motor driving capacitor of an electric transport device, and may be an F-unit super capacitor, that is, a super capacitor having a capacitance of several farads. In operations 404 and 406, second discharging device 250 is turned on to discharge the voltage stored in capacitor 260 to load 201. When first discharging device 240 and second discharging device 250 are turned on, a current from battery cell 220 and a current from capacitor 260 are transmitted to load 201 together, thereby transmitting a high current to load 201.

Figure 3:
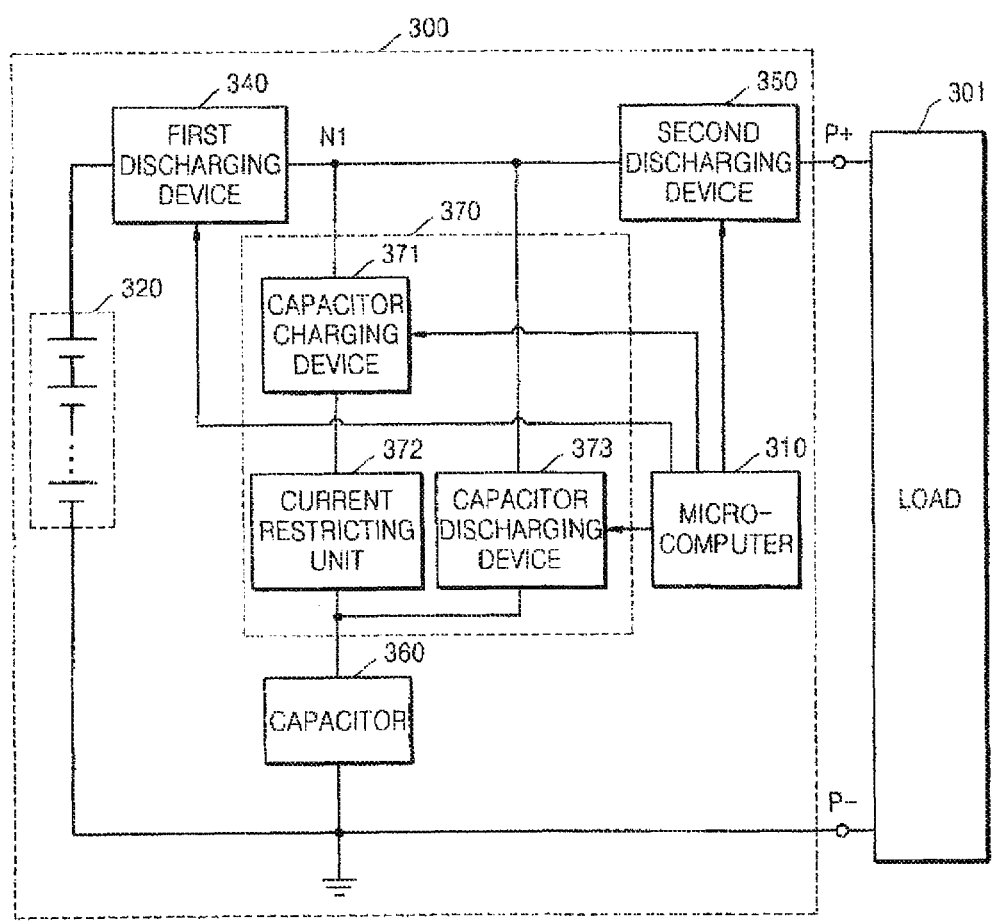
FIG. 3 is a circuit diagram illustrating a battery pack constructed as another embodiment according to the principles of the present invention.

FIG. 3 is a circuit diagram illustrating a battery pack 300 constructed as another embodiment according to the principles of the present invention.

Referring to FIG. 3, battery pack 300 includes a microcomputer 310, a battery cell 320, a first discharging device 340, a second discharging device 350, a capacitor 360, and a capacitor charge and discharge control unit 370. Capacitor charge and discharge control unit 370 includes a capacitor charging device 371, a current restricting unit 372, and a capacitor discharging device 373. Battery pack 300 of FIG. 3 is different from battery pack 200 of FIG. 2 in that capacitor charge and discharge control unit 370 is further included. Thus, battery pack 300 will be described by focusing on differences between battery packs 200 and 300 of FIGS. 2 and 3.

Due to the characteristics of capacitors, a current is continuously input to a capacitor while no electric energy has been accumulated in the capacitor. If an initial discharging switch, that is, a first discharging device, is turned off and the capacitor is empty, that is, when there is no accumulated electric energy in the capacitor, then when the initial discharging switch is turned on, the capacitor behaves the same as a load. That is, since the capacitor tends to receive a current as high as possible from a battery cell and thus there is a possibility of danger due to an over-current, capacitor charge and discharge control unit 370 for controlling charging and discharging of the capacitor is required.

Capacitor charge and discharge control unit 370 is connected between a first node N1 and capacitor 360. Capacitor charge and discharge control unit 370 controls charging or discharging of capacitor 360 according to the controlling of microcomputer 310. Capacitor charge and discharge control unit 370 includes capacitor charging device 371, current restricting unit 372, and capacitor discharging device 373. Capacitor charging device 371 and capacitor discharging device 373 may also be formed of a field effect transistor (FET) and a parasitic diode like first discharging device 340 and second discharging device 350, but are not limited thereto, and may instead be electric devices that perform the functions described above as well as other types of switching functions.

Capacitor charging device 371 is connected between first node N1 and current restricting unit 372. Capacitor charging device 371 is turned on according to the controlling of microcomputer 310 when electric energy needs to be stored in capacitor 360 so that a current from battery cell 320 flows to capacitor 360.

Current restricting unit 372 is connected between capacitor charging device 371 and capacitor 360. Current restricting unit 372 prevents an excessive current from flowing to capacitor 360 when capacitor 360 is empty, that is, when there is no accumulated electric energy in capacitor 360. Current restricting unit 372 may be formed of, for example, a diode or a static current circuit, and controls a current amount according to the controlling of microcomputer 310.

Capacitor discharging device 373 is connected between first node N1 and capacitor 360. Capacitor discharging device 373 is turned on by microcomputer 310 to supply a current to a load 301 and to discharge the electric energy charged in capacitor 360.

Microcomputer 310 controls switching operations of first discharging device 340, capacitor charging device 371, capacitor discharging device 373, and second discharging device 350.

When capacitor 360 is to be charged, first discharging device 340 and capacitor charging device 371 are turned on to charge capacitor 360. Also, when energy accumulated in capacitor 360 is to be used, microcomputer 310 turns on capacitor discharging device 373 to supply a current from capacitor 360 to load 301.

Figure 5:
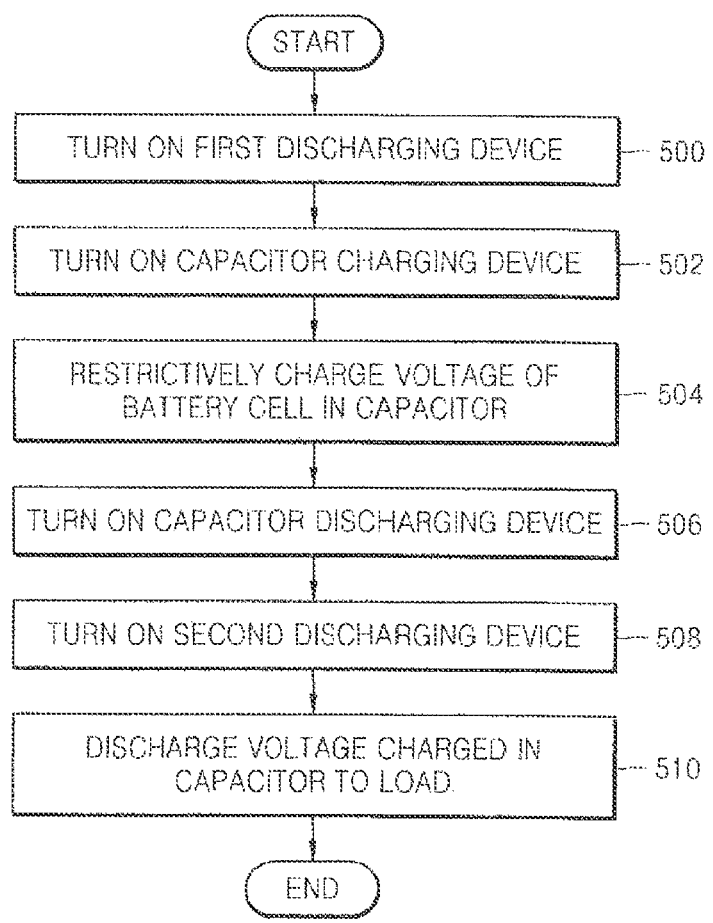
FIG. 5 is a flowchart illustrating a method of controlling the battery pack of FIG. 3, as another embodiment according to the principles of the present invention.

FIG. 5 is a flowchart illustrating a method of controlling battery pack 300 of FIG. 3, as an embodiment according to the principles of the present invention.

Referring to FIG. 5, in operation 500, first discharging device 340 is turned on. Second discharging device 350 may be turned on or turned off when first discharging device 340 is turned on. Second discharging device 350 is turned on when a great current is not required for load 301, and thus a remaining part of the current that flows from battery cell 320 flows to capacitor 360 and is stored in capacitor 360.

In operation 502, capacitor charging device 371 is turned on. In operation 504, battery cell 320 charges capacitor 360 restrictively accordingly to a voltage of battery cell 320. A current is restrictively transmitted from battery cell 320 through current restricting unit 372 to thereby restrictively charge capacitor 360. By using current restricting unit 372, an excessive current flow may be prevented if capacitor 360 is empty, thereby achieving stability.

In operations 506 through 510, capacitor discharging device 373 is turned on. When all of the electric energy stored in capacitor 360 is to be used, for example, when load 301 is a motor of an electric transport device which is initially driven or is driven uphill, capacitor discharging device 373 is turned on to supply a current to load 301 from capacitor 360.

According to the embodiment of the present invention, the battery pack includes a battery cell and a capacitor that is arranged in parallel to the battery cell. By using the battery cell, the battery power and the distance covered by an electric transport that requires an instantaneous high power output may be increased, such as an E-bike, are increased.

Also, by controlling charging and discharging of the capacitor to stably operate the capacitor, a current may be stably used in the battery pack and the lifespan of the battery pack may be increased.

While the exemplary the embodiments of the present invention has been particularly shown and described with reference to exemplary embodiments thereof, it will be understood by those of ordinary skill in the art that various changes in form and details may be made therein without departing from the spirit and scope of the embodiments of invention as defined by the appended claims. The exemplary embodiments should be considered in descriptive sense only and not for purposes of limitation. Therefore, the scope of the embodiments of the invention is defined not by the detailed description of the invention but by the appended claims, and all differences within the scope will be construed as being included in the embodiments of the present invention.

What is claimed is:

1. A battery pack, comprising:
    a battery cell;
    a first discharging device connected between the battery cell and a first node;
    a capacitor connected to the first node in parallel with the battery cell;
    a second discharging device connected between the first node and a load, said load being a motor of an electric transport device; and
    a microcomputer controlling the first discharging device and the second discharging device.

2. The battery pack of claim 1, wherein the capacitor is a motor-driving capacitor of an electric transport device.

3. The battery pack of claim 1, wherein, when initially driving the motor, an electric energy charged in the capacitor is discharged to the load according to the controlling of the microcomputer.

4. The battery pack of claim 1, wherein the electric transport device is an E-bike.

5. The battery pack of claim 1, further comprising a capacitor charging and discharging control unit connected between the first node and the capacitor,
    wherein the microcomputer controls the capacitor charging and discharging control unit.

6. The battery pack of claim 5, wherein the capacitor charging and discharging control unit comprises:
    a current restricting unit connected to the capacitor and restricting an electric current flowing to the capacitor;
    a capacitor charging device connected between the first node and the current restricting unit; and
    a capacitor discharging device connected between the capacitor and the first node.

7. The battery pack of claim 6, wherein the microcomputer controls the capacitor charging device and the capacitor discharging device.

8. The battery pack of claim 6, wherein at least one of the first discharging device, the second discharging device, the capacitor charging device, and the capacitor discharging device comprising a field effect transistor (FET).

9. A method of controlling a battery pack, the method comprising:
    providing the battery pack comprising a battery cell, a capacitor connected in parallel with the battery cell, a first discharging device, a second discharging device, and a microcomputer;
    charging the capacitor according to a voltage across the battery cell by turning on the first discharging device; and
    discharging an electric energy charged in the capacitor to a load by turning on the second discharging device, said load being a motor of an electric transport device.

10. The method of claim 9, wherein the discharging is performed when the load is a motor of an electric transport device.

11. The method of claim 9, wherein, in the discharging, the electric energy charged in the capacitor is discharged to the load according to the controlling of the microcomputer.

12. A method of controlling a battery pack, the method comprising:
    providing the battery pack comprising a battery cell, a capacitor connected in parallel with the battery cell, a capacitor charging device, a current restricting unit, and a capacitor discharging device connected between the battery cell and the capacitor, a first discharging device, a second discharging device, and a microcomputer;
    turning on the first discharging device and the capacitor charging device;
    restrictively charging the capacitor according to a voltage across the battery cell by using the current restricting unit; and
    discharging an electric energy charged in the capacitor by turning on the capacitor discharging device and the second discharging device.

13. The method of claim 12, wherein the load is a motor of an electric transport device.

14. The method of claim 13, wherein, when initially driving the motor, the electric energy charged in the capacitor is discharged to the load by turning on the capacitor discharging device and the second discharging device according to the controlling of the microcomputer.

15. The method of claim 12, wherein at least one of the first discharging device, the second discharging device, the capacitor charging device, and the capacitor discharging device comprises a field effect transistor (FET).

* * * * *